United States Patent [19]

Watanabe et al.

[11] Patent Number: 4,822,838
[45] Date of Patent: Apr. 18, 1989

[54] CURABLE CHLORINATED POLYETHYLENE AND COPOLYETHYLENE COMPOSITION

[75] Inventors: Junichi Watanabe, Nishonomiya; Kozo Misumi, Sennan; Masanobu Miyaguchi, Kobe; Seiji Kadomatsu, Toyonaka; Sei Nakazawa, Minoo, all of Japan

[73] Assignee: Osaka Soda Co., Ltd., Hyogo, Japan

[21] Appl. No.: 80,071

[22] Filed: Jul. 31, 1987

[30] Foreign Application Priority Data

Nov. 18, 1986 [JP] Japan .............................. 61-275900

[51] Int. Cl.$^4$ .................... C08L 63/00; C08L 33/08; C08L 23/28
[52] U.S. Cl. ................................ 524/178; 524/523; 525/187; 525/194; 525/227; 525/240
[58] Field of Search .............. 525/187, 194, 197, 227, 525/240; 524/178, 523

[56] References Cited

U.S. PATENT DOCUMENTS

| | | | |
|---|---|---|---|
| 3,355,519 | 11/1967 | Muller | 525/240 |
| 3,859,390 | 1/1975 | Tsuji | 525/57 |
| 4,144,289 | 3/1979 | Watanabe | 525/227 |
| 4,165,416 | 8/1979 | Matoba | 525/348 |
| 4,624,989 | 11/1986 | Berta | 525/187 |

FOREIGN PATENT DOCUMENTS 0118949  9/1980  Japan .................................. 525/227

*Primary Examiner*—John C. Bleutge
*Assistant Examiner*—David Buttner
*Attorney, Agent, or Firm*—Sherman & Shalloway

[57] ABSTRACT

A curable chlorinated polyethylene and copolyethylene composition comprising
(A) 5 to 95% by weight, based on the total weight of (A) and (B), of a chlorinated polyethylene having a chlorine content of about 20 to about 50% by weight and derived from polyethylene having a melt index of 0.01 to 100,
(B) 95 to 5% by weight, based on the total weight of (A) and (B), of a chlorinated copolymer of ethylene and a $C_2$-$C_5$ alkyl acrylate or methacrylate, said copolymer having a chlorine content of about 2 to about 45% by weight and a melt index of 0.1 to 100,
(C) 0 to 30 parts by weight, per 100 parts by weight of (A) and (B) combined, of an epichlorohydrin polymer or copolymer at least 40 mole % of which is derived from the epichlorohydrin, said polymer or copolymer having a specific reduced viscosity of 0.1 to 10 dl/g,
(D) 0.1 to 5 parts by weight, per 100 parts by weight of (A), (B) and (C) combined, of a mercaptotriazine compound as a crosslinking agent,
(E) 0.5 to 3 moles, per mole of (D), of a basic amine compound as a crosslinking accelerator, and
(F) 0.5 to 30 parts by weight, per 100 parts by weight of (A), (B) and (C) combined, of a metal compound as an acid acceptor.

16 Claims, No Drawings

CURABLE CHLORINATED POLYETHYLENE AND COPOLYETHYLENE COMPOSITION

This invention relates to a curable chlorinated polyethylene and copolyethylene composition which comprises chlorinated polyethylene and a chlorinated copolymer of ethylene and a $C_1$–$C_5$ alkyl acrylate or methacrylate as essential resin (or elastomer) components, shows excellent properties on curing, and when laminated to a layer of another curable resin (or elastomer) composition, for example, an acrylonitrile/butadiene rubber composition or an epichlorohydrin rubber composition and co-cured, can exhibit excellent curability and adhesion.

More specifically, the present invention relates to a curable chlorinated polyethylene and copolyethylene composition comprising (A) 5 to 95% by weight, based on the total weight of (A) and (B), of a chlorinated polyethylene having a chlorine content of about 20 to about 50% by weight and derived from polyethylene having a melt index of 0.01 to 100, (B) 95 to 5% by weight, based on the total weight of (A) and (B), of a chlorinated copolymer of ethylene and a $C_1$–$C_5$ alkyl acrylate or methacrylate, said copolymer having a chlorine content of about 2 to about 45% by weight and a melt index of 0.1 to 100, (C) 0 to 30 parts by weight, per 100 parts by weight of (A) and (B) combined, of an epichlorohydrin polymer or copolymer at least 40 mole% of which is derived from the epichlorohydrin, said polymer or copolymer having a specific reduced viscosity of 0.1 to 10 dl/g, (D) 0.1 to 5 parts by weight, per 100 parts by weight of (A), (B) and (C) combined, of a mercaptotriazine compound as a crosslinking agent, (E) 0.5 to 3 moles, per mole of (D), of a basic amine compound as a crosslinking accelerator, and (F) 0.5 to 30 parts by weight, per 100 parts by weight of (A), (B) and (C) combined, of a metal compound as an acid acceptor.

Chlorinated polyethylenes are known to be polymers which attain particularly superior mechanical properties, heat resistance, oil resistance, chemical resistance and weatherability among various polymeric materials when fully crosslinked. Chlorinated polyethylene produced by a method involving a chlorination step at a temperature near the melting point of crystals of polyethylene has been attracting attention as an elastomeric material.

In recent years, there has been the active practice in the field of organic polymeric materials to laminate a layer of a curable polymer composition and another layer of a polymer composition having different properties from the first-mentioned polymer, and cure and bond the two layers to produce a laminated structure having the properties of the respective compositions.

In spite of the fact that chlorinated polyethylenes have the excellent properties mentioned above, when a layer of a curable chlorinated polyethylene composition is to be laminated to a layer of another adherend such as a curable acrylonitrile/butadiene rubber composition, and cured and bonded, the adhesion of the chlorinated polyethylene composition to the adherend is not entirely high depending upon the type of the adherend. Hence, the range of utilization of the chlorinated polyethylenes is limited.

Some proposals have been made heretofore in order to overcome these technical trouble of the chlorinated polyethylene.

For example, Japanese Laid-Open Patent Publication No. 58449/1985 (laid-open on Apr. 4, 1985) discloses a chlorinated polyethylene composition comprising (i) 100 parts by weight of chlorinated polyethylene, (ii) 0.5 to 10.0 parts by weight of a tackifier, (iii) 0.5 to 15.0 parts by weight of a dehydrochlorination preventing agent for vinyl chloride polymers, and (iv) 0.01 to 20 parts by weight of an organic peroxide. As the tackifier (ii), this patent document illustrates coumarone-indene resin, phenol-terpene resins and petroleum hydrocarbon resins produced by polymerizaing coumarone, indene, styrene, etc. contained in coal tar, and rosin derivatives.

This patent document quite fails to describe or suggest a resin composition comprising the components (A) and (B) in this invention as essential ingredients. Furthermore, many of the tackifiers in this patent document inhibit crosslinking reaction in the presence of organic peroxides. Hence, in curing the above chlorinated polyethylene composition, it is necessary to add an excess of the organic peroxide. This entails handling risks and causes difficulty in practical application.

Furthermore, when a layer of a curable chlorinated polyethylene composition comprising the above organic peroxide as a crosslinking agent and a layer of an acrylonitrile/butadiene rubber or epichlorohydrin rubber containing a sulfur-containing vulcanizer are to be co-cured and bonded, the above organic peroxide migrates to acrylonitrile/butadiene rubber or epichlorohydrin rubber as the adherend to degrade such rubber. Or the additives such as an antioxidant contained in such rubbers migrates to the chlorinated polyethylene to hamper crosslinking with the organic peroxide. If the crosslinking of the polymer is hampered, the polymer or the plasticizer as an additive for it dissolves in an oil atmosphere, and a deleterious effect on the adhesion of the chlorinated polyethylene having excellent oil resistance cannot be avoided. According to the method of crosslinking with organic peroxides, disadvantages in process steps owing to retardation of crosslinking reaction in an air atmosphere cannot be circumvented. For example, mold releasing is poor, and therefore, the percentage of unacceptable products increases. Furthermore, the organic peroxides entail handling risks because they decompose at low temperatures.

The present inventors have made extensive investigations in order to develop a curable chlorinated polyethylene composition free from the aforesaid technical troubles of the curable chlorinated polyethylene composition and having various improved properties including improved curability and adhesion.

As a result, the present inventors have found that a composition comprising a blend of the aforesaid chlorinated polyethylene (A) and chlorinated copolyethylene (B) as essential resin (or elastomer) components gives cured products having excellent properties and shows excellent improved co-curability and adhesion with and to another curable resin (or elastomer) composition such as a acrylonitrile/butadiene rubber composition or an epichlorohydrin rubber composition. On further investigations, the present inventors have found that a composition comprising as an essential resin (or elastomer) component a blend of the chlorinated polyethylene (A), the chlorinated copolyethylene (B) and the epichlorohydrin polymer or copolymer (C) exhibits more improved curability and adhesion.

It is an object of this invention therefore to provide a curable chlorinated polyethylene and copolyethylene having various improved properties including improved curability and adhesion.

The above and other objects of this invention along with its advantages will become more apparent from the following description.

In the curable chlorinated polyethylene and copolyethylene composition comprising the components (A) to (F), the component (A) is 5 to 95% by weight, based on the total weight of (A) and (B), of a chlorinated polyethylene having a chlorine content of about 20 to about 50% by weight and derived from polyethylene having a melt index of 0.01 to 100. The melt index, as referred to in this invention, means a value measured in accordance with ASTM D1238.

The chlorinated polyethylene (A) is preferably amorphous chlorinated polyethylene. The amorphous chlorinated polyethylene herein denotes chlorinated polyethylene having a heat of fusion, determined by differential scanning calorimetry (DSC), of not more than 0.5 cal/g. The heat of fusion is measured at a temperature elevating rate of 10° C./min. using a differential calorimeter (Model DSC-1B, made by Perkin Elmer Company).

Methods of producing the chlorinated polyethylene (A) are known, and such chlorinated polyethylenes are commercially available. The known methods are disclosed, for example, in U.S. Pat. Nos. 3,759,888 and 4,547,554.

The component (B) in the curable chlorinated polyethylene and copolyethylene composition is 95 to 5% by weight, based on the total weight of (A) and (B), of a chlorinated copolymer of ethylene and a $C_1$-$C_5$ alkyl acrylate or methacrylate [to be sometimes abbreviated as $C_1$-$C_5$ alkyl (meth)acrylate]. This chlorinated copolymer has a chlorine content of about 2 to about 45% by weight and a melt index of 0.1 to 100. The melt index is measured as stated hereinabove with regard to component (A).

Methods per se of producing the chlorinated copolyethylene (B) are known. It can be produced by post-chlorinating a copolymer of ethylene and at least one member selected from the group consisting of $C_1$-$C_5$ alkyl acrylates and $C_1$-$C_5$ alkyl methacrylates, which can be produced by methods known per se or are commercially available, in accordance with the above-illustrated known methods of producing chlorinated polyethylene. The method of producing the starting copolymer used in the post-chlorination is disclosed, for example, in U.S. Pat. Nos. 2,200,429; 2,467,234; and 2,953,551.

The $C_1$-$C_5$ alkyl-(meth)acrylate may, for example, be a compound represented by the following formula (I)

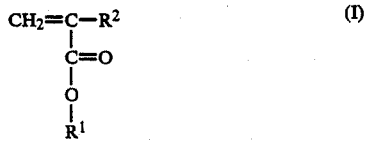

wherein $R^1$ represents an alkyl group having 1 to 5 carbon atoms, and $R^2$ represents hydrogen or a methyl group.

Specific examples include methyl acrylate, ethyl acrylate, n-butyl acrylate, t-butyl acrylate, methyl methacrylate, ethyl methacrylate, n-butyl methacrylate and t-butyl methacrylate.

The post-chlorination may be carried out by a solution method or an aqueous suspension method which has heretofore been practiced. The solution method requires large expenses for solvent recovery, and the viscosity of the reaction solution in the chlorination step is a problem. Hence, the aqueous suspension method is generally preferred.

The commercially available copolymer is usually available in granular or pellet form. Desirably, it is mechanically pulverized before use. The pulverization may be carried out by using, for example, a "Turbo Mill" (made by Turbo Kogyo K.K.) or a "Victory Mill" (made by Hosokawa Micron Co., Ltd.). The pulverized particles preferably have a particle diameter of about 1 to 500 micrometers, especially about 10 to 200 micrometers.

The content of the $C_1$-$C_4$ alkyl (meth)acrylate in the chlorinated copolyethylene (B) may be properly selected. Preferably, it is at least 1% by weight, especially 2 to 20% by weight, based on the weight of (B). If the amount of the $C_1$-$C_5$ alkyl (meth)acrylate in the chlorinated copolyethylene (B) is too small below the above-specified range, a satisfactory improvement in curability and adhesion is difficult to achieve.

The chlorinated copolyethylene (B) used in this invention has a melt index of 0.1 to 100 because it gives a composition of this invention which gives a cured product having excellent properties for use as an elastomeric material. The chlorinated copolyethylene (B) has a chlorine content of about 2 to about 45% by weight, preferably about 10 to about 40% by weight. If the chlorine content is too high beyond the above range, the rubbery elasticity of the cured product is too low or its processability is reduced. In addition, chlorination of the starting copolyethylene requires a long period of time. If, on the other hand, the chlorine content is too low below the specified limit, the amount of chlorine atoms in the molecular chain of the chlorinated copolyethylene which become crosslinking sites in curing is too small, and a sufficient crosslinked structure cannot be formed.

In the curable chlorinatd polyethylene and copolyethylene composition of this invention, the blending ratio of the chlorinated polyethylene (A) to the chlorinated copolyethylene (B) is such that based on the total weight of (A) and (B), the proportion of (A) is 5 to 95% by weight and the proportion of (B) is 95 to 5% by weight. If the proportion of the chlorinated polyethylene (A) is less than 5% by weight [i.e., the amount of the chlorinated copolyethylene (B) exceeds 95% by weight], it is difficult to maintain the excellent properties of the chlorinated polyethylene (A) itself. If the amount of the chlorinated copolyethylene (B) is less than 5% by weight [i.e., the amount of the chlorinated polyethylene (A) exceeds 95% by weight], it is difficult to improve curability and adhesion by the chlorinated copolyethylene (B) to a satisfactory extent.

The curable chlorinated polyethylene and copolyethylene composition of this invention may further include an epichlorohydrin polymer or copolymer (C). The component (C) is 0 to 30 parts by weight, preferably 3 to 30 parts by weight, per 100 parts by weight of (A) and (B), of an epichlorohydrin polymer or copolymer at least 40 mole% of which is derived from the epichlorohydrin. The polymer or copolymer (C) has a specific reduced viscosity of 0.1 to 10 dl/g.

In the present invention, the specific reduced viscosity is calculated in accordance with the following equation from $t_o$, c and $t_1$ values which are measured by a capillary viscometer using monochlorobenzene as a solvent.

$$\text{Specific reduced viscosity} = \frac{t_1 - t_o}{t_o c} \ (g/dl)$$

wherein
$t_o$ is the flowing time (sec.) of the solvent measured at 80° C.,
c is the concentration of the polymer in the solvent (g/dl, c=0.1), and
$t_1$ is the flowing time (sec.) of the solution of the polymer measured at 80° C.

The epichlorohydrin polymer or copolymer (C) and methods for its preparation are known, and it is also commercially available. Examples of the methods are the method described in U.S. Pat. No. 3,773,694 in which a reaction product of an organotin compound with a phosphoric acid ester is used as a catalyst, and the method described in U.S. Pat. No. 3,880,979 in which a reaction product of a silicon compound, an aluminum compound and a phosphoric acid ester is used as a catalyst.

The component (C) may, for example, be epichlorohydrin homopolymer, or a copolymer of epichlorohydrin with a monomer selected from the group consisting of ethylene oxide, propylene oxide, butadiene oxide, styrene oxide, cyclohexene oxide, ethyl glycidyl ether and allyl glycidyl ether. The epichlorohydrin copolymer may be either an amorphous rubbery copolymer or a crystalline plastic copolymer. At least 40 mole% of the copolymer is derived from epichlorohydrin. If the proportion of epichlorohydrin is less than 40 mole%, the crosslinking speed is undesirably slow in curing.

Specific examples of the component (C) include polyepichlorohydrin, and epichlorohydrin copolymers such as epichlorohydrin/ethylene oxide copolymer, epichlorohydrin/allyl glycidyl ether copolymer, and epichlorohydrin/ethylene oxide/allyl glycidyl ether terpolymer with an epichlorohydrin content of at least 40 mole% but less than 100 mole%.

To improve curability and adhesion to a practically satisfactory extent by the joint use of the component (C), it is preferred to use at least 3 parts by weight of the component (C) per 100 parts by weight of (A) and (B) combined. If the amount of the component (C) is too large beyond 30 parts by weight per 100 parts by weight of (A) nd (B) combined, undesirable scorching is likely to occur in the curing of the composition of this invention.

In addition to the essential components (A) and (B) and the optional component (C), the curable chlorinated polyethylene and copolyethylene composition of this invention includes (D) a crosslinking agent, (E) a crosslinking accelerator and (F) an acid acceptor.

The component (D) is 0.1 to 5 parts by weight, preferably 0.5 to 3 parts by weight, per 100 parts by weight of (A), (B) and (C) combined, of a mercaptotriazine compound as a crosslinking agent.

The component (E) is 0.5 to 3 moles, per mole of (D), of a basic amine compound as a crosslinking accelerator.

The component (F) is 0.5 to 30 parts by weight, preferably 0.5 to 20 parts by weight, per 100 parts by weight of (A), (B) and (C), of a metal compound as an acid acceptor.

The components (D), (E) and (F) individually are known as a crosslinking agent, a crosslinking accelerator and an acid acceptor respectively for use in a curable resin (or elasomer) composition. In the present invention, it is necessary to use them in combination.

The mercaptotriazine compound (D) may, for example, be a compound represented by the following formula (II)

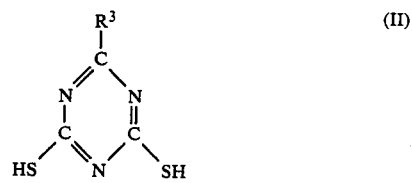

wherein $R^3$ is a member selected from the group consisting of a mercapto group, alkylamino groups with the alkyl moiety containing 1 to 8 carbon atoms, dialkylamino groups with the alkyl moiety containing 1 to 8 carbon atoms, cycloalkylamino groups with the cycloalkyl moiety containing 6 to 8 carbon atoms, dicycloalkylamino groups with the alkyl moiety containing 6 to 8 carbon atoms, arylamino groups, N-aryl-N-alkylamino groups with the alkyl moiety containing 1 to 8 carbon atoms and alkoxy groups containing 1 to 8 carbon atoms.

Specific examples of the mercaptotriazine compound (II) are 1,3,5-trithiocyanuric acid, 1-methoxy-3,5-dimercaptotriazine, 1-hexylamino-3,5-dimercaptotriazine, 1-diethylamino-3,5-dimercaptotriazine, 1-dibutylamino-3,5-dimercaptotriazine, 1-cyclohexylamino-3,5-dimercaptotriazine, 1-cyclohexylamino-3,5-dimercaptotriazine, and 1-phenylamino-3,5-dimercaptotriazine.

The basic amine compound (E) may, for example, be at least one compound selected from amines having a boiling point of more than about 110° C., organic acid salts or organic acid adducts of the amines, diarylguanidines, condensation products between aniline and aldehydes and 2-benzothiazyl sulfenamides of primary or secondary amines.

Specific preferred examples of the basic amine compound (E) include $C_5$-$C_{20}$ aliphatic primary amines, $C_5$-$C_{20}$ aliphatic secondary amines, $C_5$-$C_{20}$ aliphatic tertiary amines, $C_5$-$C_{20}$ alicyclic primary amines, $C_5$-$C_{20}$ alicyclic secondary amines and $C_5$-$C_{20}$ alicyclic tertiary amines; organic acid salts or organic acid adducts of these aliphatic or alicyclic amines, such as $C_2$-$C_{18}$ aliphatic carboxylic acid salts and carbamic acid salts of these amines; mercaptobenzothiazole salts of these aliphatic or alicyclic amines; diarylguanines; condensation products of aniline and aldehydes, preferably $C_1$-$C_7$ aldedhydes; and 2-benzothiazyl sulfenamides of primary or secondary amines represented by the following formula (III)

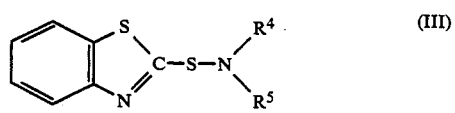

wherein $R^4$ and $R^5$ may be identical or different and each represents a hetero atom-free member selected from the group consisting of hydrogen, $C_1$–$C_{12}$ alkyl groups, $C_3$–$C_{12}$ cycloalkyl groups and $C_7$–$C_{12}$ aralkyl groups, provided that $R^4$ and $R^5$ are not hydrogen atoms at the same time.

$C_5$–$C_{20}$ aliphatic primary, secondary and tertiary amines and $C_5$–$C_{20}$ alicyclic primary, secondary and tertiary amines as the basic amine compound (E) preferably have a pK value (ion dissociation constant) of not more than about 4.5.

Specific examples of such a basic amine compound are n-hexylamine, octylamine, dibutylamine, tributylamine, trioctylamine, di(2-ethylhexyl)amine, dicyclohexylamine and hexamethylenediamine.

Preferably, the organic acid salt or organic acid adduct of such an aliphatic or alicyclic amine as component (E) is a salt or adduct of such an amine having a pK value of not more than about 4.5 with an organic acid having a pK value of at least about 2.0. Typical examples of the amine organic acid salt include n-butylamine acetate, dibutylamine oleate, hexamethylenediamine carbamate and a dicyclohexylamine salt of 2-mercaptobenzothizole. Examples of the diarylguanidines as the component (E) are di($C_6$–$C_8$ aryl)guanidines such as diphenylguanidine and ditolylguanidine. Examples of the condensate between aniline and the aldehyde as component (E) are a condensate between anilin and butyraldehyde, a condensate between aniline and heptaldehyde and a condensate between aniline and acetaldehyde and butyraldehyde. In the 2-benzothiazyl sulfenamide of a primary or a secondary amine represented by formula (III), the primary or secondary amine forming the sulfenamide preferably has a pK value of not more than 4.5. Specific examples include cyclohexylamine, butylamines, diethylamines, dipropylamines, dibutylamines, dihexylamines, dioctylamines, dilaurylamines and dicycloamines.

As the acid acceptor (F), it is desirable to select metal compounds which impart a proper crosslinking speed to the curable composition of this invention and gives a cured product having stability. Preferably, they are compounds of metals of Groups II and IVA of the periodic table.

These metal compounds may, for example, be oxides, hydroxides, carboxylates, silicates, carbonates, phosphites and borates of metals of Group II of the periodic table and oxides, basic phosphites, basic carbonates, basic carboxylates, basic sulfites and tribasic sulfates of metals of Group IVA of the periodic table. Specific examples include magnesia, magnesium hydroxide, barium hydroxide, magnesium carbonate, barium carbonate, quick lime (CaO), slaked lime, calcium carbonate, calcium silicate, calcium stearate, zinc stearate, calcium phthalate, magnesium phosphite, calcium phosphite, zinc oxide, tin oxide, litharge, lead red, lead white, dibasic lead phthalate, dibasic lead carbonate, tin stearate, basic lead phosphite, basic tin phosphite, basic lead sulfite and tribasic lead sulfate.

As is customary in the art, the curable chlorinated polyethylene and copolyetheylene composition of this invention may contain various other compounding agents, such as fillers, reinforcing agents, plasticizers, stabilizers, antioxidants, lubricants, coloring agents and fire retardants. The amounts of these compounding agents are, for example, at most 1000 parts by weight for fillers or reinforcing agents, at most 100 parts by weight for plasticizers, at most 10 parts by weight for stabilizers and antioxidants, at most 5 parts by weight for lubricants, at most 30 parts by weight for coloring agents, and at most 100 parts by weight for fire retardants, each per 100 parts by weight of components (A), (B) and (C) combined.

Examples of the fillers include various carbon blacks, magnesium carbonate, calcium carbonate, aluminum silicate, hydrous magnesium silicate, silicon dioxided, diatomaceous earth, aluminum sulfate, barium sulfate and calcium sulfate.

Examples of the plasticizers include trimellitic acid derivatives such as trioctyl trimellitate, phthalic acid derivatives such as di(2-ethylhexyl)phthalate, aliphatic dibasic acid derivatives such as di(2-ethylhexyl)adipate, azelate or sebacate, phosphoric acid derivatives such as tributyl phosphate, epoxy derivatives such as epoxidized soybean oil, paraffin derivatives such as chlorinated paraffin, paraffinic process oils, naphthenic process oils and aromatic process oils.

Examples of the stabilizers or antioxidants are amine compounds, for example naphthylamine compounds such as phenyl-alpha-naphthylamine, diphenylamine compounds such as p-isopropoxy-diphenylamine, and p-phenylenediamine compounds such as N,N'-diphenyl p-phenylenediamine; quinoline compounds such as 6-ethoxy-2,2,4-trimethyl-1,2-dihydroquinoline and 2,2,4-trimethyl-1,2-dihydroquinone polymer; hydroquinone compounds such as 2,5-di-(t-amyl)hyroquinone; and phenolic compounds, for example, monophenol compounds such as 2,6-di-t-butyl-4-methylphenol and bisphenol compounds such as 2,2'-methylene-bis-(4-methyl-6-t-butylphenol); metallic soaps such as calcium stearate and barium stearate; inorganic acid salts such as tribasic lead sulfate and dibasic lead phosphite; and organotin compounds such as t-butyltin dilaurate and dibutyltin maleate.

Examples of the lubricants are hydrocarbon compounds such as liquid paraffin and low-molecular-weight polyethylene, fatty acid compounds such as stearic acid, fatty acid amides such as stearamide, fatty acid esters such as n-butyl stearate, and aliphatic alcohols such as decyl alcohol.

Examples of the coloring agents include inorganic coloring agents such as titanium dioxide, carbon blacks, red iron oxide, titanium yellow, cobalt green, ultramarine, and manganese violet, and organic coloring agents such as azo pigments, nitroso pigments, nitro pigments and phthalocyanine pigments.

Examples of the first retardant include such inorganic compounds as antimonyl oxide and aluminum hydroxide, and phosphoric esters such as tris(chloroethyl)-phosphate.

The curable chlorinated polyethylene and copolyethylene composition of this invention may be prepared by mixing the components (A) to (F) and as desired, other compounding agents illustrated above as uniformly as possible. The sequence of mixing the components and the other compounding agents may be properly chosen. For example, there may be employed a method comprising mixing the resin (or elastomer) components (A), (B) and (C) first, mixing the mixture with other compounding agents such as fillers and plasticizers, and thereafter mixing the resulting mixture with the components (D), (E) and (F).

In this mixing procedure, an extruder, a kneader, a Banbury mixer and an open roll may be cited as examples of devices for mixing the components (A), (B) and (C) and mixing the resulting mixture with the other compounding agents. The mixing temperature may, for example, be room temperature to 200° C. The components (A), (B) and (C) may be in any desired form such as a powder, pellet, sheet or block. When they are powders or pellets, they may be pre-mixed by a Henschel mixer and then mixed further by an extruder, kneader, Banbury mixer, etc. Mixing of the resulting mixture with the components (D), (E) and (F) may be carried out by using a kneader, a Henschel mixer, an open roll, etc., preferably the open roll. The temperature at which the components (D), (E) and (F) are mixed is, for example, room temperature to 150° C., preferably room temperature to 120° C. When the mixing temperature exceeds 120° C., it is preferred to use a mixing time of as short as, for example, less than 10 minutes, particularly 1 to 5 minutes. In this way, the temperature and time are controlled to avoid substantial cure of the resulting curable composition.

A curable chlorinated polyethylene and copolyethylene composition in accordance with this invention which comprises 1 to 30 parts by weight, per 100 parts by weight of components (A), (B) and (C) combined, of CaO as the component (F) and further contains 0.1 to 2 parts by weight, per 100 parts by weight of components (A), (B) and (C), of an organic tin compound as a scorch inhibitor is particularly suitable for curing by microwave heating.

The organic tin compound used at this time may, for example, be an organic tin compound of the following formula

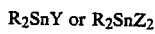

$R_2SnY$ or $R_2SnZ_2$ wherein R represents an alkyl group having 1 to 20 carbon atoms, Y represents O or a dicarboxylic acid moiety having 3 to 20 carbon atoms, and Z represents a carboxylic acid moiety having 1 to 20 carbon atoms, which also include dibutyltin dilaurate shown as one example of the antioxidant.

Specific examples of this compound are di-n-butyltin maleate, di-n-octyltin maleate, di-n-butyltin succinate and di-n-butyltin oxide.

A cured composition having excellent properties may be prepared by curing the curable chlorinated polyethylene and copolyethylene composition of the invention by heating. This curable composition shows excellent curability and adhesion. Curing may be carried out by known methods practiced with regard to known curable chlorinated polyethylene compositions. For example, the curing temperature may be 120° to 200° C. For the aforesaid composition suitable for curing by microwave heating, curing temperatures of up to 250° C. may further be used. The curing time may, for example, be 0.5 minute to 4 hours.

There is no particular restriction on heat sources used to cure the curable composition of this invention, and any known heating means can be employed. They include, for example, a heated mold, a heating roll, a vapor kettle, a hot air bath, a molten salt bath, a heated glass bead bath, infrared irradiation and microwave irradiation.

The curable composition of this invention may be formed into a co-cured product having additivity without impairing the properties of the individual components (A), (B) and (C). The composition further exhibits greatly improved curability and adhesion in lamination to another type of rubber. Hence, it has a great utilitarian value as a laminate which can make use of the properties of both. In particular, since the composition of this invention has particularly superior adhesion to epichlorohydrin rubber or acrylonitrile/butadiene rubber, it can be effectively used in applications requring oil resistance, ozone resistance and heat resistance, such as fuel hose in an engine section.

The following examples illustrate the present invention in greater detail.

Production of chlorinated copolyethylenes

Chlorinated copolyethylene B-1:

A glass-lined pressure reactor was charged with 5 kg of an ethylene/ethyl acrylate copolymer powder having a melt index of 0.5 and an ethyl acrylate content of 18% by weight, 70 liters of water, a wetting agent and a dispersant. With stirring, the temperature was elevated to 80° C., and chlorine gas was introduced into the reactor. The chlorination reaction was carried out at 80° C. and 3 kg/cm$^2$-G for 5 hours. After the reaction, the chlorinated copolyethylene was washed and dried to give 6.9 kg of chlorinated ethylene/ethyl acrylate copolymer having a chlorine content of 30% by weight.

Chlorinated copolyethylene B-2:

Chlorinated ethylene/ethyl acrylate copolymer (5.5 kg) having a chlorine content of 13% by weight was prepared in the same way as in the preparation of the chlorinated copolyethylene B-1 except that the reaction time was changed to 2.5 hours.

Chlorinated copolyethylene B-3:

Chlorinated ethylene/ethyl acrylate copolymer (7.7 kg) having a chlorine content of 40% by weight was prepared in the same way as in the preparation of the chlorinated copolyethylene B-1 except that the reaction time was changed to 7 hours.

Chlorinated copolyethylene B-4:

Chlorinated ethylene/ethyl acrylate copolymer (6.7 kg) having a chlorine content of 31% by weight was prepared in the same way as in the preparation of the chlorinated ethylene copolymer B-1 except that ethylene/ethyl acrylate copolymer powder having a melt index of 0.7 and an ethyl acrylate content of 3.5% by weight was used as the starting copolyethylene and the reaction time was changed to 5.5 hours.

Chlorinated copolyethylene B-5:

Chlorinated ethylene/ethyl acrylate copolymer (9.0 kg) having a chlorine content of 48.5% by weight was prepared in the same way as in the preparation of the chlorinated copolyethylene B-1 except that the reaction time was changed to 14 hours.

When in the chlorination reaction step, the chlorine content of the chlorinated copolyethylene exceeded 40% by weight, the rate of the reaction abruptly decreased, and a long period was required for chlorination as stated above.

Production of epichlorohydrin polymers

Epichlorohydrin polymer C-1:

Dehydrated n-hexane (105 kg) and 45 kg of epichlorohydrin were put in a 300-liter stainless steel polymerization vessel, and mixed with stirring. To the mixture was added 150 g of a catalyst composed of a product obtained by reacting aluminum triisopropoxide, silicon tetrachloride and tributyl phosphate, and epichlorohydrin was polymerized at 60° C. The reaction was stopped 20 hours later to give 43.5 kg (yield 96.7%) of epichlorohydrin rubber having a weight average molecular weight of 620,000.

Epichlorohydrin polymer C-2:

Crystalline epichlorohydrin polymer (44.2 kg; 98.2%) was prepared in the same way as in the preparation of the epichlorohydrin polymer C-1 above except that the polymerization reaction was carried out at 25° C. for 10 hours using 120 g of a reaction product of dibutyltin oxide and tributyl phosphate as a catalyst. The resulting epichlorohydrin polymer C-2 had a weight average molecular weight of 100,000.

Epichlorohydrin polymer C-3:

Epichlorohydrin/ethylene oxide copolymer rubber (44.6 kg; yield 94.5%) having an epichlorohydrin content of 48 mole% and a weight average molecular weight of 870,000 was prepared in the same way as in the preparation of the epichlorohydrin polymer C-1 except that the amount of epichlorohydrin was changed to 32 kg and 15.2 kg of ethylene oxide was added, and 122 g of the same catalyst as used in the preparation of the epichlorohydrin polymer C-2 was used.

Epichlorohydrin polymer C-4:

Epichlorohydrin/ethylene oxide copolymer rubber (44.9 kg; yield 96%) having an epichlorohydrin content of 34 mole% and a weight average molecular weight of 230,000 was prepared in the same way as in the preparation of the epichlorohydrin polymer C-1 except that the amount of epichlorohydrin was changed to 24.8 kg, 22 kg of ethylene oxide was added, and these monomers were copolymerized at 15° C. for 10 hours using 122 g of the same catalyst as used in the preparation of the epichlorohydrin polymer C-2.

EXAMPLES 1-11 AND COMPARATIVE EXAMPLES 1-5

In each run, the polymer components shown in Table 1 were first mixed, and then the resulting mixture was mixed with the other components indicated in Table 1. The mixture was kneaded by a roll at 70° C. for 10 minutes to prepare a sheet having a thickness of about 2 mm.

Separately, an epichlorohydrin rubber sheet having a thickness of about 2 mm and an acrylonitrile/butadiene rubber sheet having a thickness of about 2 mm were prepared as above in accordance with the following recipes.

|  | Parts by weight |
|---|---|
| Epichlorohydrin rubber sheet | |
| Epichlorohydrin rubber (*1) | 100 |
| HAF carbon | 40 |
| Magnesium oxide | 5 |
| Trithiocyanuric acid | 0.8 |
| Diphenylguanidine | 0.6 |
| Acrylonitrile/butadiene rubber sheet | |
| Acrylonitrile/butadiene rubber (*2) | 100 |
| HAF carbon | 40 |
| Zinc oxide | 5 |
| N—cyclohexyl-2-benzothiazyl sulfenamide | 2 |
| Tetramethylthiuram disulfide | 1.5 |
| Sulfur | 0.5 |

(*1): "Epichlomer-C": a trademark for a product of Osaka Soda Co., Ltd.
(*2): "N230 S", a product of Japan Synthetic Rubber Co., Ltd.

The sheet from the blended composition prepared as above was superimposed on the epichlorohydrin rubber sheet or the acrylonitrile/butadiene rubber sheet, and the assembly was co-cured at 160° C. and 100 kg/cm² for 30 minutes to form a laminate.

The delamination strength of the resulting laminate was measured in accordance with the peeling test in JIS K6301, and the results are shown in Table 1.

Comparative Example 1 was directed to a chlorinated polyethylene sheet containing no chlorinated copolyethylene.

Comparative Example 2 was directed to a sheet prepared from a blend of ethylene/ethyl acrylate copolymer as a starting material for the chlorinated copolyethylenes B-1 to B-3 and chlorinated polyethylene.

Comparative Example 3 was directed to a sheet of a blend of a chlorinated copolyethylene having a chlorine content outside the scope of the invention and chlorinated polyethylene. In Comparative Example 3, at a kneading temperature of 70° C., the chlorinated copolyethylene and the chlorinated polyethylene did not get mixed uniformly with each other, and at higher temperatures, a uniform sheet could not be formed. Accordingly, lamination to the other rubber was not carried out.

Comparative Example 4 was directed to a mixture of chlorinated polyethylene and epichlorohydrin polymer.

Comparative Example 5 was directed to a blend of chlorinated polyethylene and chlorinated copolyethylene outside the scope of the invention.

Table 1 demonstrates that the compositions of this invention excepting one used in Example 4 had adhesion strengths to rubbers to such an extent as to cause fracture of the rubbers, which were much higher than those of the compositions of Comparative Examples.

COMPARATIVE EXAMPLE 6

An organic peroxide was used as a crosslinking agent and a composition having the following recipe was kneaded using the same chlorinated polyethylene and chlorinated copolyethylene B-1 as in the above Examples, and formed into a sheet having a thickness of about 2 mm.

| Recipe | |
|---|---|
| Ingredient | Parts by weight |
| Chlorinated polyethylene | 50 |
| Chlorinated copolyethylene B-1 | 50 |
| Calcium carbonate | 100 |
| Diocty phthalate | 30 |
| Dicumyl peroxide | 2.5 |
| Magnesium oxide | 10 |
| Triallyl isocyanurate | 2.5 |

The above sheet was superimposed on the same acrylonitrile/butadiene rubber sheet as used in the above Examples, and press-formed at 160° C. and 100 kg/cm² for 30 minutes to form a laminate. The laminate had an adhesion strength of 5.5 kg/25 mm.

The laminate was subjected to an immersion test in fuel oil C as stipulated in JIS K6301. After immersion at 40° C. for 48 hours, the oil became whitely turbid. A laminate obtained by the above procedure except that the press-forming time was changed to 90 minutes to perform sufficient curing was tested in the same way, and the oil was likewise became whitely turbid. When the laminate of Example 2 was subjected to the same immersion test, no change was observed in the fuel oil C.

TABLE 1

| | Example | | | | | | | | |
|---|---|---|---|---|---|---|---|---|---|
| | 1 | 2 | 3 | 4 | 5 | 6 | 7 | 8 | 9 |
| Chlorinated polyethylene (1) | 10 | 90 | 90 | 50 | 50 | 50 | 90 | 50 | 10 |
| Chlorinated copolyethylene | | | | | | | | | |
| B-1 | 90 | 50 | 10 | | | | 10 | | |
| B-2 | | | | 50 | | | | 50 | |
| B-3 | | | | | 50 | | | | 90 |
| B-4 | | | | | | 50 | | | |
| B-5 | | | | | | | | | |
| Epichlorohydrin polymer | | | | | | | | | |
| C-1 | | | | | | | 10 | 5 | 25 |
| C-2 | | | | | | | | | |
| C-3 | | | | | | | | | |
| Calcium carbonate | 100 | 100 | 100 | 100 | 100 | 100 | 100 | 100 | 100 |
| Dioctyl phthalate | 30 | 30 | 30 | 30 | 30 | 30 | 30 | 30 | 30 |
| Trithiocyanuric acid | 1 | 1 | 1 | 1 | 1 | 1 | 1 | 1 | 1 |
| Magnesium oxide | 10 | 10 | 10 | 10 | 10 | 10 | 10 | 10 | 10 |
| 2-Mercaptobenzothiazole salt of dicyclohexylamine | 2 | 2 | 2 | 2 | 2 | 2 | 2 | 2 | 2 |
| Adhesion strength (kg/25 mm) | | | | | | | | | |
| to epichlorohydrin rubber | 9.3* | 10.9* | 11.6* | 8.6 | 12.0* | 8.5* | 14.3* | 11.1* | 15.7* |
| to acrylonitrile/butadiene rubber | 10.4* | 11.1* | 10.8* | 8.7 | 11.7* | 9.9* | 12.3* | 10.2* | 13.5* |

| | Example | | Comparative Example | | | | |
|---|---|---|---|---|---|---|---|
| | 10 | 11 | 1 | 2 | 3 | 4 | 5 |
| Chlorinated polyethylene (1) | 90 | 90 | 100 | 50 | 50 | 100 | 90 |
| Chlorinated copolyethylene | | | | | | | |
| B-1 | 10 | 10 | | | | | 10 |
| B-2 | | | | | | | |
| B-3 | | | | | | | |
| B-4 | | | | | | | |
| B-5 | | | | | | | |
| Epichlorohydrin polymer | | | | | 50 | | |
| C-1 | | | | 25 | | | |
| C-2 | 10 | | | | | | |
| C-3 | | 10 | | | | | |
| C-4 | | | | | | | 10 |
| Ethylene-ethylacrylate copolymer | | | 50 | | | | |
| Calcium carbonate | 100 | 100 | 100 | 100 | 100 | 100 | 100 |
| Dioctyl phthalate | 30 | 30 | 30 | 30 | 30 | 30 | 30 |
| Trithiocyanuric acid | 1 | 1 | 1 | 1 | 1 | 1 | 1 |
| Magnesium oxide | 10 | 10 | 10 | 10 | 10 | 10 | 10 |
| 2-Mercaptobenzothiazole salt of dicyclohexylamine | 2 | 2 | 2 | 2 | 2 | 2 | 2 |
| Adhesion strength (kg/25 mm) | | | | | | | |
| to epichlorohydrin rubber | 15.0* | 11.8* | 4.0 | 5.1 | — | 5.6 | 6.2 |
| to acrylonitrile/butadiene rubber | 12.4* | 12.0* | 4.9 | 4.5 | — | 4.7 | 4.8 |

(1): Rubbery product having a chlorine content of 40% by weight produced from high-density polyethylene (melt index 0.8)
*Showing the occurrence of rubber fracture.

EXAMPLES 12-21 AND COMPARATIVE EXAMPLES 7-14

In each run, the polymer ingredients in component I were pre-mixed by a kneader, and the mixture was then mixed with the remaining ingredients in component I indicated in Table 2 while controlling the jacket temperature of the kneader such that at the end of mixing, the composition attained a temperature of 190° C. Then, the resulting composition was mixed with component II in Table 2 to prepare a ribbon like composition having a thickness of about 5 mm and a width of about 30 mm.

The chlorinated polyethylene in the composition was the same as the chlorinated polyethylene indicated in Table 1.

The composition was extruded into a tube having an inside diameter of 8 mm and an outside diameter of 14 mm at a rate of 3 meters/min. by a vent-type extruder with a cylinder diameter of 4.5 mm, and then passed through a microwave heating device having a frequency of 2,450 MHz and a heating section with a length of 1 m. When the output of the microwaves was 50 KW, the temperature of the composition at the outlet of the microwave heating device was 180° to 190° C.

The composition which left the microwave heating device was immediately put in a Geer's oven at 220° C. for 5 minutes to heat it and complete its curing.

The expansion ratio of the cured tube was measured and determined as shown below. The results are shown in Table 3.

The above sheet and the UHF-cured tube were each cut to form square samples of about 2 cm × 2 cm, and the specific gravities of these cut samples were measured. The expansion ratio was calculated in accordance with the following equation.

$$\text{Expansion ratio (\%)} = \left(1 - \frac{\text{Specific gravity of UHF-cured tube}}{\text{Specific gravity of the sheet}}\right) \times 100$$

When the expansion ratio was not more than 5%, the cured tube was subjected to a tensile test and a hardness test in accordance with JIS K-6301. The results are shown in Table 3.

Separately, an epichlorohydrin rubber sheet having a thickness of about 2 mm and an acrylonitrile/butadiene rubber sheet having a thickness of about 2 mm were prepared as above in accordance with the following recipes.

|  | Parts by weight |
|---|---|
| Epichlorohydrin rubber sheet | |
| Epichlorohydrin rubber (*1) | 100 |
| HAF carbon | 40 |
| Magnesium oxide | 5 |
| Trithiocyanuric acid | 0.8 |
| Diphenylguanidine | 0.6 |
| Quick lime (*3) | 3 |
| Acrylonitrile/butadiene rubber sheet | |
| Acrylonitrile/butadiene rubber (*2) | 100 |
| HAF carbon | 40 |
| Zinc oxide | 5 |
| N—cyclohexyl-2-benzothiazyl sulfenamide | 2 |
| Tetramethylthiuram disulfide | 1.5 |
| Sulfur | 0.5 |
| Quick lime (*3) | 10 |

(*1): "Epichlomer-C", a product of Osaka Soda Co., Ltd.
(*2): "N230 S", a product of Japan Synthetic Rubber Co., Ltd.
(*3): CML #21, a product of Ohmi Chemical Co., Ltd.

Two vent-type exruders of the type described above were connected by a crosshead die, the rubber sheet obtained in each of Examples 12 to 21 and Comparative Examples 8 and 14 as an outside layer and the epichlorohydrin rubber sheet or the acrylonitrile/butadiene rubber sheet as an inside layer were co-extruded to form a rubber tube having an inside diameter of 8 mm and an outside diameter of 18 mm (the inside layer rubber material had a thickness of 3 mm, and the outside layer rubber material and a thickness of 2 mm). The resulting two-layer rubber tube was UHF-cured in the same way as stated hereinabove.

The laminate obtained was subjected to a peeling test in accordance with JIS K-6301. The results are shown in Table 3.

In the Examples of this invention, expansion ratios, tensile properties and adhesion strengths were satisfactory. In Comparative Example 7 in which no quick lime was incorporated, the expansion ratio was very high. In Comparative Example 8 in which quick lime was incorporated in an amount of 35 parts which is above the upper limit specified in this invention, the expansion ratio was low, but tensile properties and adhesion strength were inferior. In Comparative Examples 9 to 12 in which stabilizers outside the scope of the invention were used, the expansion ratio was slightly high, and there was no scorch inhibiting effect. In Comparative Example 13 in which a known scorch inhibiting agent was incorporated, there was a scorch inhibiting effect observed, but the expansion ratio was high. In Comparative Example 14 in which the organotin compound in accordance with this invention was incorporated in an amount exceeding the upper limit specified in this invention, the expansion ratio was low, but the tensile properties were inferior and the adhesion strength was not sufficient.

TABLE 2

|  |  | Example |  |  |  |  |  |  |  |  |  |
|---|---|---|---|---|---|---|---|---|---|---|---|
|  |  | 12 | 13 | 14 | 15 | 16 | 17 | 18 | 19 | 20 | 21 |
| Component I | Chlorinated polyethylene | 90 | 90 | 90 | 90 | 90 | 90 | 90 | 90 | 90 | 50 |
|  | Chlorinated copolyethylene B-1 | 10 | 10 | 10 | 10 | 10 | 10 | 10 | 10 | 10 | 50 |
|  | Epichlorohydrin polymer C-1 | 10 | 10 | 10 | 10 | 10 | 10 | 10 | 10 | 10 | 15 |
|  | Carbon black (1) | 80 | 80 | 80 | 80 | 80 | 80 | 80 | 80 | 80 | 100 |
|  | Plasticizer (2) | 30 | 30 | 30 | 30 | 30 | 30 | 30 | 30 | 30 | 30 |
|  | Calcium hydroxide | 1 | 1 | 1 | 1 | 1 | 1 | 1 | 1 | 1 | 1 |
|  | 2-Mercaptobenzothiazole salt of dicyclohexylamine | 2 | 2 | 2 | 2 | 2 | 2 | 2 | 2 | 2 | 2 |
| Component II | Trithiocyanuric acid | 1 | 1 | 1 | 1 | 1 | 1 | 1 | 1 | 1 | 1 |
|  | Quick lime | 10 | 10 | 10 | 10 | 10 | 10 | 10 | 5 | 25 | 10 |
|  | Di-n-butyltin maleate | 0.5 | 1.5 | 2.0 | — | — | — | — | 1.0 | 1.0 | 1.0 |
|  | Di-n-octyltin maleate | — | — | — | 1.0 | — | — | — | — | — | — |
|  | Di-n-butyltin dilaurate | — | — | — | — | 1.0 | — | — | — | — | — |
|  | Di-n-butyltin oxide | — | — | — | — | — | 1.0 | — | — | — | — |
|  | Di-n-butyltin succinate | — | — | — | — | — | — | 1.0 | — | — | — |
|  | Barium stearate | — | — | — | — | — | — | — | — | — | — |
|  | Tribasic lead sulfate | — | — | — | — | — | — | — | — | — | — |
|  | Dibasic lead phosphite | — | — | — | — | — | — | — | — | — | — |
|  | Dibutyl maleate | — | — | — | — | — | — | — | — | — | — |
|  | N—(cyclohexylthio)phthalimide | — | — | — | — | — | — | — | — | — | — |

|  |  | Comparative Example |  |  |  |  |  |  |  |
|---|---|---|---|---|---|---|---|---|---|
|  |  | 7 | 8 | 9 | 10 | 11 | 12 | 13 | 14 |
| Component I | Chlorinated polyethylene | 90 | 90 | 90 | 90 | 90 | 90 | 90 | 90 |
|  | Chlorinated copolyethylene B-1 | 10 | 10 | 10 | 10 | 10 | 10 | 10 | 10 |
|  | Epichlorohydrin polymer C-1 | 10 | 10 | 10 | 10 | 10 | 10 | 10 | 10 |
|  | Carbon black (1) | 80 | 80 | 80 | 80 | 80 | 80 | 80 | 80 |
|  | Plasticizer (2) | 30 | 30 | 30 | 30 | 30 | 30 | 30 | 30 |
|  | Calcium hydroxide | 1 | 1 | 1 | 1 | 1 | 1 | 1 | 1 |
|  | 2-Mercaptobenzothiazole salt of dicyclohexylamine | 2 | 2 | 2 | 2 | 2 | 2 | 2 | 2 |
| Component II | Trithiocyanuric acid | 1 | 1 | 1 | 1 | 1 | 1 | 1 | 1 |
|  | Quick lime | 0 | 35 | 10 | 10 | 10 | 10 | 10 | 10 |
|  | Di-n-butyltin maleate | 1 | 1 | — | — | — | — | — | 3 |
|  | Di-n-octyltin maleate | — | — | — | — | — | — | — | — |
|  | Di-n-butyltin dilaurate | — | — | — | — | — | — | — | — |
|  | Di-n-butyltin oxide | — | — | — | — | — | — | — | — |
|  | Di-n-butyltin succinate | — | — | — | — | — | — | — | — |
|  | Barium stearate | — | — | 1 | — | — | — | — | — |
|  | Tribasic lead sulfate | — | — | — | 1 | — | — | — | — |

TABLE 2-continued

|  | | | | | | | | |
|---|---|---|---|---|---|---|---|---|
| Dibasic lead phosphite | — | — | — | — | 1 | — | — | — |
| Dibutyl maleate | — | — | — | — | — | 1 | — | — |
| N—(cyclohexylthio)phthalimide | — | — | — | — | — | — | 1 | — |

(1): "Asahi Thermal" (tradename, Asahi Carbon Co., Ltd.)
(2): "ADK Cizer C-8" (tradename, Adeka Argus Chemical Co., Ltd.)

TABLE 3

|  | Example | | | | | | | | | |
|---|---|---|---|---|---|---|---|---|---|---|
|  | 12 | 13 | 14 | 15 | 16 | 17 | 18 | 19 | 20 | 21 |
| Mooney scorch large rotor at 125° C. $t_5$ (min.) | 10.6 | 15.3 | 19.4 | 12.5 | 13.6 | 12.3 | 10.3 | 14.1 | 17.5 | 11.8 |
| Expansion ratio (%) | 0 | 0 | 0 | 0 | 0 | 0 | 0 | 0 | 0 | 0 |
| Tensile test | | | | | | | | | | |
| $M_{100}$ (kg/cm$^2$) | 25 | 26 | 27 | 25 | 26 | 24 | 26 | 30 | 23 | 19 |
| $M_{330}$ (kg/cm$^2$) | 81 | 84 | 86 | 79 | 85 | 79 | 85 | 91 | 72 | 61 |
| Tb (kg/cm$^2$) | 129 | 130 | 125 | 125 | 131 | 126 | 135 | 135 | 114 | 118 |
| Eb (%) | 420 | 410 | 390 | 430 | 420 | 430 | 420 | 440 | 390 | 430 |
| Hs (JIS A) | 69 | 69 | 70 | 68 | 70 | 69 | 70 | 68 | 72 | 66 |
| Adhesion strength (kg/25 mm) | | | | | | | | | | |
| to epichlorohydrin rubber | 15.1 | 15.2 | 15.5 | 14.7 | 15.6 | 14.4 | 14.6 | 16.0 | 11.0 | 11.9 |
| to acrylonitrile rubber | 12.7 | 12.8 | 11.8 | 11.8 | 12.5 | 12.1 | 11.9 | 14.3 | 10.1 | 10.8 |

|  | Comparative Example | | | | | | | |
|---|---|---|---|---|---|---|---|---|
|  | 7 | 8 | 9 | 10 | 11 | 12 | 13 | 14 |
| Mooney scorch large rotor at 125° C. $t_5$ (min.) | 13.8 | 21.5 | 6.8 | 6.4 | 6.0 | 5.9 | 12.5 | 30< |
| Expansion ratio (%) | 170 | 0 | 5 | 6 | 7 | 6 | 13 | 0 |
| Tensile test | | | | | | | | |
| $M_{100}$ (kg/cm$^2$) | | 13 | | | | | | 11 |
| $M_{330}$ (kg/cm$^2$) | | 29 | | | 22 | | | |
| Tb (kg/cm$^2$) | | 70 | | | 45 | | | |
| Eb (%) | | 280 | | | 700 | | | |
| Hs (JIS A) | | 73 | | | 55 | | | |
| Adhesion strength (kg/25 mm) | | | | | | | | |
| to epichlorohydrin rubber | | 7.5 | | | 4.2 | | | |
| to acrylonitrile rubber | | 6.8 | | | 3.8 | | | |

What is claimed is:

1. A curable chlorinated polyethylene and copolyethylene composition comprising
   (A) 5 to 95% by weight, based on the total weight of (A) and (B), of a chlorinated polyethylene having a chlorine content of about 20 to about 50% by weight and derived from polyethylene having a melt index of 0.01 to 100,
   (B) 95 to 5% by weight, based on the total weight of (A) and (B), of a chlorinated copolymer of ethylene and a $C_1$-$C_5$ alkyl acrylate or methacrylate, said copolymer having a chlorine content of about 2 to about 45% by weight and a melt index of 0.1 to 100,
   (C) 0 to 30 parts by weight, per 100 parts by weight of (A) and (B) combined, of an epichlorohydrin polymer or copolymer at least 40 mole% of which is derived from the epichlorohydrin, said polymer or copolymer having a specific reduced viscosity of 0.1 to 10 dl/g,
   (D) 0.1 to 5 parts by weight, per 100 parts by weight of (A), (B) and (C) combined, of a mercaptotriazine compound as a crosslinking agent,
   (E) 0.5 to 3 moles, per mole of (D), of a basic amine compound as a crosslinking accelerator, and
   (F) 0.5 to 30 parts by weight, per 100 parts by weight of (A), (B) and (C) combined, of a metal compound as an acid acceptor.

2. The composition of claim 1 wherein the $C_1$-$C_5$ alkyl acrylate or methacrylate content of the chlorinated copolymer (B) is 2 to 20% by weight based on the weight of the copolymer (B).

3. The composition of claim 1 wherein the mercaptotriazine compound (D) is a compound represented by the following formula (II)

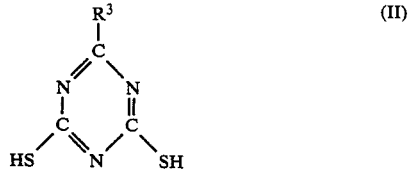

(II)

wherein $R^3$ is a member selected from the group consisting of a mercapto group, alkylamino groups with the alkyl moiety containing 1 to 8 carbon atoms, dialkylamino groups with the alkyl moiety containing 1 to 8 carbon atoms, cycloalkylamino groups with the cycloalkyl moiety containing 6 to 8 carbon atoms, dicycloalkylamino groups with the alkyl moiety containing 6 to 8 carbon atoms, arylamino groups, N-aryl-N-alkylamino groups with the alkyl moiety containing 1 to 8 carbon atoms and alkoxy groups containing 1 to 8 carbon atoms.

4. The composition of claim 1 wherein the basic amine compound (E) is a compound selected from the group consisting of $C_5$-$C_{20}$ aliphatic primary, secondary and tertiary amines; $C_5$-$C_{20}$ alicyclic primary, secondary and tertiary amines; $C_2$-$C_{18}$ aliphatic carboxylic acid salts of these aliphatic and alicyclic amines; mercaptobenzothiazole salts of these aliphatic and alicyclic amines; di($C_6$-$C_8$ aryl)guanidines; condensation products between aniline and $C_1$-$C_7$ aldehydes; and 2-benzothiazyl sulfonamides of primary or secondary amines represented by the following formula (III)

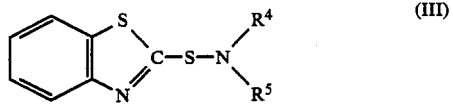

wherein $R^4$ and $R^5$ may be identical or different and each represents a hetero atom-free member selected from the group consisting of hydrogen, $C_1$-$C_{12}$ alkyl groups, $C_3$-$C_{12}$ cycloalkyl groups and $C_7$-$C_{12}$ aralkyl groups, with the proviso that $R^4$ and $R^5$ are not hydrogens at the same time.

5. The composition of claim 1 wherein the metal compound (F) is a compound of a metal selected from the group consisting of metals of Groups II and IVA of the periodic table.

6. The composition of claim 1 suitable for curing by microwave heating in which the metal compound (F) is CaO in an amount of 1 to 30 parts by weight per 100 parts by weight of (A), (B) and (C) combined, and which further comprises 0.1 to 2 parts by weight, per 100 parts by weight of (A), (B) and (C) combined, of an organic tin compound as a scorch inhibiting agent.

7. The composition of claim 1 wherein said chlorinated polyethylene is amorphous chlorinated polyethylene.

8. The composition of claim 1 wherein said $C_1$-$C_5$ alkyl acrylate or methacrylate is selected from the group consisting of methyl acrylate, ethyl acrylate, n-butyl acrylate, t-butyl acrylate, methyl methacrylate, ethyl methacrylate, n-butyl methacrylate and t-butyl methacrylate.

9. The composition of claim 1 wherein said chlorinated copolymer of ethylene and a $C_1$-$C_5$ alkyl acrylate or methacrylate has a chlorine content of about 10 to about 40% by weight.

10. The composition of claim 1 wherein said epichlorohydrin polymer or copolymer is present in an amount of 3 to 30 parts by weight, per 100 parts by weight of (A) and (B).

11. The composition of claim 1 further comprising at least one filler, said at least one filler being present in an amount of not more than 1,000 parts by weight for each 100 parts by weight of (A), (B) and (C), combined.

12. The composition of claim 1 further comprising at least one plasticizer, said at least one plasticizer being present in an amount of not more than 100 parts by weight for each 100 parts by weight of (A), (B) and (C), combined.

13. The composition of claim 1, further comprising at least one stabilizer or antioxidant, said at least one stabilizer being present in an amount of not more than 10 parts by weight for each 100 parts by weight of (A), (B) and (C), combined.

14. The composition of claim 1, further comprising at least one lubricant, said at least one lubricant being present in an amount of not more than 5 parts by weight for each 100 parts by weight of (A), (B) and (C), combined.

15. The composition of claim 1, further comprising at least one coloring agent, said at least one coloring agent being present in an amount of not more than 30 parts by weight for each 100 parts by weight of (A), (B) and (C), combined.

16. The composition of claim 1, further comprising at least one fire retardant, said at least one fire retardant being present in an amount of not more than 100 parts by weight for each 100 parts by weight of (A), (B) and (C), combined.

* * * * *